(12) United States Patent
Behrens et al.

(10) Patent No.: US 11,813,980 B2
(45) Date of Patent: Nov. 14, 2023

(54) MOTOR VEHICLE COMPONENT WITH LIGHTING FUNCTION

(71) Applicant: Bayerische Motoren Werke Aktiengesellschaft, Munich (DE)

(72) Inventors: Nicolas Behrens, Marzling (DE); Sandro Cifaldi, Munich (DE); Tobias Mueller-Kambeitz, Landau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 290 days.

(21) Appl. No.: 17/297,056

(22) PCT Filed: Nov. 22, 2019

(86) PCT No.: PCT/EP2019/082171
§ 371 (c)(1),
(2) Date: May 26, 2021

(87) PCT Pub. No.: WO2020/126301
PCT Pub. Date: Jun. 25, 2020

(65) Prior Publication Data
US 2022/0024377 A1  Jan. 27, 2022

(30) Foreign Application Priority Data
Dec. 21, 2018  (DE) .................... 10 2018 133 306.4

(51) Int. Cl.
*B60Q 3/54* (2017.01)
*F21S 43/14* (2018.01)
(Continued)

(52) U.S. Cl.
CPC ............... *B60Q 3/54* (2017.02); *B32B 5/022* (2013.01); *B32B 5/024* (2013.01); *B32B 5/26* (2013.01);
(Continued)

(58) Field of Classification Search
CPC ....... B29C 70/68–88; B29L 2031/3005–3055; B32B 5/022–26; B32B 2260/021–046;
(Continued)

(56) References Cited

U.S. PATENT DOCUMENTS 6,092,915 A   7/2000  Rensch
9,421,849 B2 * 8/2016  Benyahia ............ B60Q 1/2696
(Continued)

FOREIGN PATENT DOCUMENTS

CN  201659928 U  12/2010
CN  102092340 A   6/2011
(Continued)

OTHER PUBLICATIONS

Chinese-language Office Action issued in Chinese Application No. 201980065955.6 dated Apr. 14, 2022 with English translation (16 pages).
(Continued)

*Primary Examiner* — Jason M Han
(74) *Attorney, Agent, or Firm* — Crowell & Moring LLP

(57) ABSTRACT

A motor vehicle component with a lighting function includes a laminate component having a first fiber-reinforced composite material and a second fiber-reinforced composite material, the first fiber-reinforced composite material being electrically insulating and the second fiber-reinforced composite material being electrically conductive. The motor vehicle component also includes a light source which is at least partially embedded in the first fiber-reinforced composite material. The light source is electrically conductively connected to the second fiber-reinforced composite material, and the second fiber-reinforced composite material has a light exit region from which light emitted by the light source can exit so that it can be seen from outside the motor vehicle component.

15 Claims, 2 Drawing Sheets

(51) Int. Cl.
  *F21S 43/31* (2018.01)
  *F21S 43/19* (2018.01)
  *B32B 5/02* (2006.01)
  *B32B 5/26* (2006.01)
(52) U.S. Cl.
  CPC ............. *F21S 43/14* (2018.01); *F21S 43/195* (2018.01); *F21S 43/31* (2018.01); *B32B 2260/021* (2013.01); *B32B 2260/046* (2013.01); *B32B 2262/101* (2013.01); *B32B 2262/106* (2013.01); *B32B 2307/206* (2013.01); *B32B 2307/412* (2013.01); *B32B 2605/003* (2013.01)
(58) Field of Classification Search
  CPC .......... B32B 2262/101–106; B32B 2307/206; B32B 2307/412; B32B 2605/003; B60Q 3/54; F21S 43/14; F21S 43/195; F21S 43/31; F21S 43/50
  See application file for complete search history.

(56) References Cited

U.S. PATENT DOCUMENTS

| | | |
|---|---|---|
| 2005/0083710 A1 | 4/2005 | Moser |
| 2005/0128760 A1 | 6/2005 | Moser |
| 2010/0214795 A1 | 8/2010 | Salter et al. |
| 2012/0098455 A1 | 4/2012 | Marwede et al. |
| 2016/0250963 A1 | 9/2016 | Reuschel et al. |
| 2017/0120810 A1 | 5/2017 | Twork et al. |
| 2017/0217366 A1 | 8/2017 | Kraemer et al. |

FOREIGN PATENT DOCUMENTS

| | | |
|---|---|---|
| CN | 105705378 A | 6/2016 |
| CN | 106935149 A | 7/2017 |
| CN | 107068711 A | 8/2017 |
| CN | 107406034 A | 11/2017 |
| DE | 198 11 076 A1 | 9/1999 |
| DE | 100 38 762 A1 | 2/2002 |
| DE | 203 15 251 U1 | 1/2004 |
| DE | 102 59 828 A1 | 7/2004 |
| DE | 103 41 572 A1 | 5/2005 |
| DE | 10 2007 039 416 A1 | 2/2009 |
| DE | 10 2009 029 874 A1 | 12/2010 |
| DE | 20 2009 011 177 U1 | 12/2010 |
| DE | 10 2010 039 270 A1 | 2/2011 |
| DE | 10 2015 103 850 A1 | 9/2016 |
| ES | 2 300 131 T3 | 6/2008 |

OTHER PUBLICATIONS

International Search Report (PCT/ISA/210) issued in PCT Application No. PCT/EP2019/082171 dated Feb. 13, 2020 with English translation (five (5) pages).

German-language Written Opinion (PCT/ISA/237) issued in PCT Application No. PCT/EP2019/082171 dated Feb. 13, 2020 (seven (7) pages).

German-language Search Report issued in German Application No. 10 2018 133 306.4 dated Jul. 17, 2019 with partial English translation (16 pages).

* cited by examiner

MOTOR VEHICLE COMPONENT WITH LIGHTING FUNCTION

BACKGROUND AND SUMMARY OF THE INVENTION

A motor vehicle component which has a lighting function is specified. The motor vehicle component can be e.g. a structural component of a motor vehicle or a part of interior trim of a motor vehicle. Furthermore, a motor vehicle comprising at least one such motor vehicle component is specified.

In the related art it is known to produce vehicle components from fiber composite material, which can comprise for example carbon fibers embedded into a plastic matrix. The carbon fibers act as reinforcement fibers of the component, and the reinforcements can be laid along the force flow lines. Components made of carbon fiber reinforced plastic are distinguished by a low mass and at the same time high stiffness and strength.

Besides these properties, vehicle components made of fiber composite material do not usually have any further functions. Furthermore, the carbon fibers embedded in the plastic matrix are normally hardly visible toward the outside, with the result for example that customers can only be given a vague impression of the level of sophistication involved in the development and production of such vehicle components.

Hitherto, lighting in motor vehicles, such as in automobiles, for example, has often only been realized by using separate components applied to second components. By way of example, the interior lighting or the exterior lighting is secured in or led past the respective structural component. This has a disadvantageous effect on the weight, the costs and the structural space of components. Furthermore, applying covers means that the surface of the component, which is a fiber composite component, for example, is partly or entirely concealed by the cover.

One object to be achieved by at least some embodiments is that of specifying an integral motor vehicle component with a lighting function which comprises a fiber composite material and is fashioned at the same time in a visually appealing and load-bearing manner. A further object is to specify a motor vehicle comprising at least one such motor vehicle component.

These objects are achieved by subjects according to the claimed invention.

The motor vehicle component described here has a lighting function. In particular, the motor vehicle component comprises a laminate component comprising a first fiber composite material and at least one second fiber composite material, wherein the first fiber composite material is electrically insulating and the second fiber composite material is electrically conductive. Furthermore, the motor vehicle component comprises at least one light source which is at least partly embedded in the first fiber composite material. The light source is electrically conductively connected to the second fiber composite material. The second fiber composite material has a light exit region, from which light emitted by the light source can exit so that it is perceptible from outside the motor vehicle component. The light exit region can be embodied e.g. as an optical window.

The light source can be e.g. an LED or an OLED or an LED light strip having a plurality of LEDs.

Preferably, the first fiber composite material is at least partly light-transmissive or translucent or transparent. Furthermore, the first fiber composite material can be embodied in such a way that at least in part it is opaque and/or can act as an optical diffuser which can distribute light homogeneously. By way of example, the first fiber composite material can comprise a laid scrim and/or woven fabric composed of glass fibers and/or carbon fibers. Furthermore, the first fiber composite material can comprise a matrix material, such as e.g. a plastic matrix, in which the glass fibers and/or carbon fibers are embedded.

In accordance with a further embodiment, the second fiber composite material comprises carbon fibers. The carbon fibers can be processed in an embroidering process or braiding process, for example. Preferably, the second fiber composite material is laid in the motor vehicle component in a manner conforming to the load flow. The second fiber composite material can likewise comprise a matrix material, such as e.g. a plastic matrix, in which the carbon fibers are embedded.

In accordance with a further embodiment, the light exit region is formed by matrix material of the second fiber composite material. Preferably, the matrix material is light-transmissive, for example translucent or transparent. By way of example, resin-rich passages forming one or more light exit regions can be formed in the second fiber composite material.

In accordance with a further embodiment, the second fiber composite material comprises translucent and/or transparent fibers which at least partly form the light exit region. The fibers can be e.g. glass fibers or plastic fibers.

In accordance with a further embodiment, the motor vehicle component comprises at least one contact which electrically conductively connects the light source to the second fiber composite material. The contact enables the light source to be electrically contacted with an electrically conductive fiber of the second fiber composite material.

In accordance with a further embodiment, the laminate component comprises a further second fiber composite material that is electrically conductive, wherein the first fiber composite material is arranged between the second fiber composite material and the further second fiber composite material. The further second fiber composite material can be embodied identically to the second fiber composite material that has been described above. Consequently, the further second fiber composite material can have one or more features of the embodiments mentioned in association with the second fiber composite material.

The light source can be e.g. electrically conductively connected to the second fiber composite material and the further second fiber composite material. In particular, the light source can be electrically conductively connected to at least one electrically conductive fiber of the second fiber composite material and to at least one electrically conductive fiber of the further second fiber composite material. Furthermore, the light source can be electrically conductively connected to the second fiber composite material by a contact and can be electrically conductively connected to the further second fiber composite material by a further contact.

In accordance with a further embodiment, a reflection layer is arranged between the first fiber composite material and the further second fiber composite material and is configured to reflect light emitted by the light source in such a way that the reflected light can exit from the light exit region, in particular from the light exit region formed in the second fiber composite material. Indirect coupling out of light is thus achieved by the reflection layer.

In accordance with a further embodiment, the motor vehicle component comprises at least one functional layer arranged directly on the second fiber composite material.

The functional layer can be transparent or translucent. Preferably, the functional layer is applied on a surface of the second fiber composite material facing away from the first fiber composite material. By way of example, the functional layer can be an electrically insulating layer. Furthermore, the motor vehicle component can comprise a further functional layer, in particular a further electrically insulating layer, which is applied on a surface of the further second fiber composite material facing away from the first fiber composite material. An electrical insulation of the motor vehicle component can be achieved as a result, which insulation is necessary on account of the electrical contacting of the second fiber composite material and/or of the further second fiber composite material.

In accordance with a further embodiment, the motor vehicle component is embodied as a structural component of a motor vehicle or as an interior component of a motor vehicle. By way of example, the motor vehicle component can be a sill profile or a roof frame component, or an interior trim or interior paneling component, such as e.g. an interior strip. Furthermore, the motor vehicle component can be embodied for example as an exterior mirror cap, such as e.g. as a CFRP exterior mirror cap with or without an integrated flashing indicator.

In accordance with a further preferred embodiment, the motor vehicle component is a rear lighting unit which is integratable or integrated into a rear end, e.g. with a flashing indicator, brake light, rear light, wherein the light source or all the light sources is or are integrated in the laminate and emit(s) light via the transparent regions of the fiber composite material or of the CFRP component.

Furthermore, a motor vehicle comprising a motor vehicle component described here is specified. The motor vehicle is preferably an automobile.

By way of a light source or LED being incorporated directly into the laminate component, the lighting can be incorporated in an invisible manner, without the structure of the component being disturbed. With the light switched off a normal CFRP surface is exhibited. Once the light is activated, the structure of the laminate becomes clearly visible.

The optionally incorporated reflection layer makes it possible to realize indirect lighting over a large area.

The connection of the light source or light sources can be implemented firstly in a conventional manner by using cables, which are likewise laid in the laminate in an invisible manner, and/or by using two electrically isolated CFRP layers. By using the lighting, the fiber structure can be highlighted by the integrated lighting in order e.g. to indicate a load-guiding path of the fiber composite component by using lighting effects.

Further advantages and advantageous embodiments of the motor vehicle component described here are evident from the embodiments described below in association with FIGS. 1A to 2B.

DETAILED DESCRIPTION OF THE DRAWINGS

In the exemplary embodiments and figures, identical or identically acting constituent parts may be provided with the same reference signs in each case. The elements illustrated and their size relationships among one another should not be regarded as true to scale, in principle. Rather, individual elements may be illustrated with exaggerated thickness or size dimensions in order to enable better illustration and/or in order to afford a better understanding.

Figure 1A:
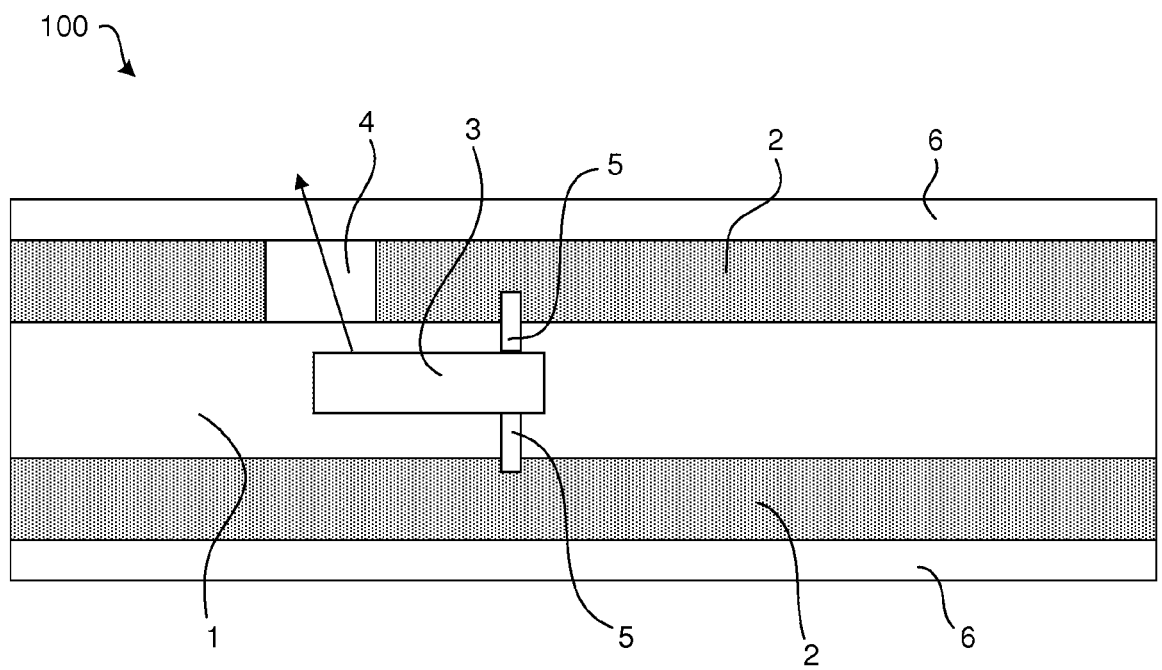
FIG. 1A shows a schematic illustration of a motor vehicle component with a lighting function in accordance with a first exemplary embodiment.

FIG. 1A shows a motor vehicle component 100 with a lighting function comprising a laminate component comprising a first fiber composite material 1, a second fiber composite material 2, and a further second fiber composite material 2, wherein the first fiber composite material 1 is electrically insulating and the second fiber composite material 2 and the further second fiber composite material 2 are electrically conductive. The first fiber composite material 1 is arranged between the second fiber composite material 2 and the further second fiber composite material 2.

Furthermore, the laminate component comprises a plurality of light sources, only one light source 3 of which is illustrated, which is embedded in the first fiber composite material 1. The light source 3 is embodied as an LED and is electrically conductively connected to the second fiber composite material 2. The second fiber composite material has a light exit region 4, from which light emitted by the light source 3 can exit directly so that it is perceptible from outside the motor vehicle component 100. Overall at least one light exit region in each case can be provided per light source.

Furthermore, the motor vehicle component 100 comprises a contact 5 and a further contact 5, which electrically conductively connect the light source 3 to the second fiber composite material 2 and the further second fiber composite material 2, respectively.

On the surfaces respectively facing away from the first fiber composite material 1, the second fiber composite 2 material and the further second fiber composite material 2 each comprise a transparent, electrically insulating layer 6, which electrically insulating the motor vehicle component 100 toward the outside.

Figure 1B:
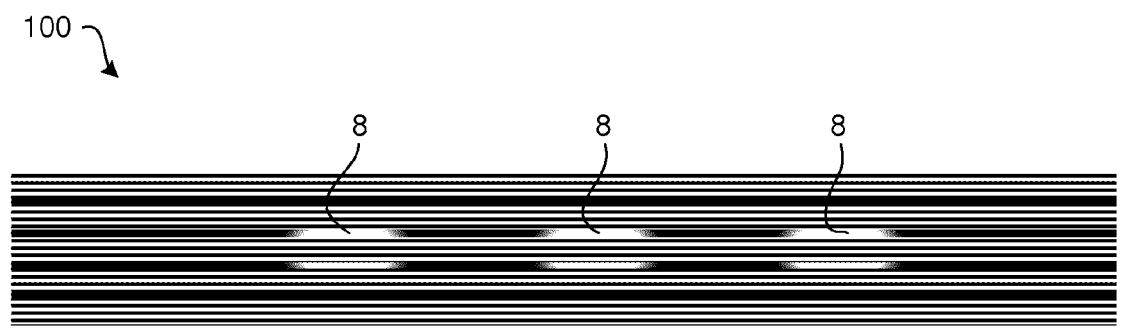
FIG. 1B shows a schematic illustration of the motor vehicle component from FIG. 1A in a further view.

FIG. 1B illustrates the motor vehicle component 100 from FIG. 1A in a further view, in which a plan view of the second fiber composite material 2 or of the transparent, electrically insulating layer 6 is shown. The light 8 emitted by the light sources 3 directly from the light exit regions 4, which light generates direct lighting, is able to be discerned well here.

Figure 2A:
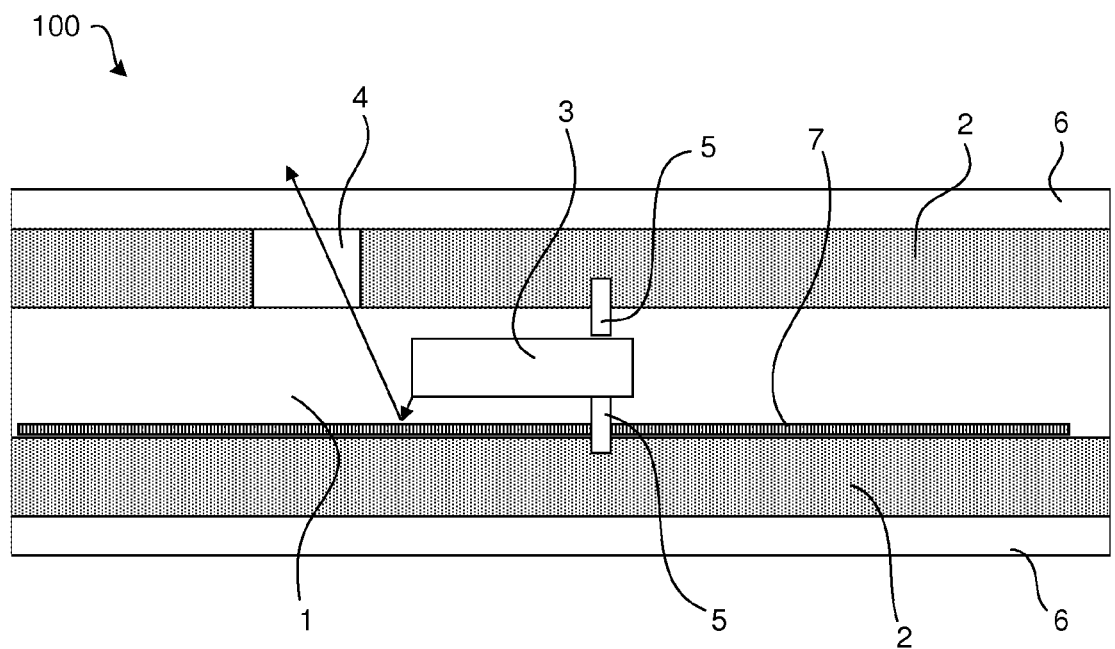
FIG. 2A shows a schematic illustration of a motor vehicle component with a lighting function in accordance with a second exemplary embodiment.

FIG. 2A shows a schematic illustration of a motor vehicle component 100 with lighting function in accordance with a second exemplary embodiment. In contrast to the example illustrated in FIG. 1A, a reflection layer 7 is arranged between the first fiber composite material 1 and the further second fiber composite material 2 and is configured to reflect light emitted by the light source 3 in such a way that the reflected light can exit from the light exit region 4. The reflection layer 7 provides indirect coupling out of light.

Figure 2B:
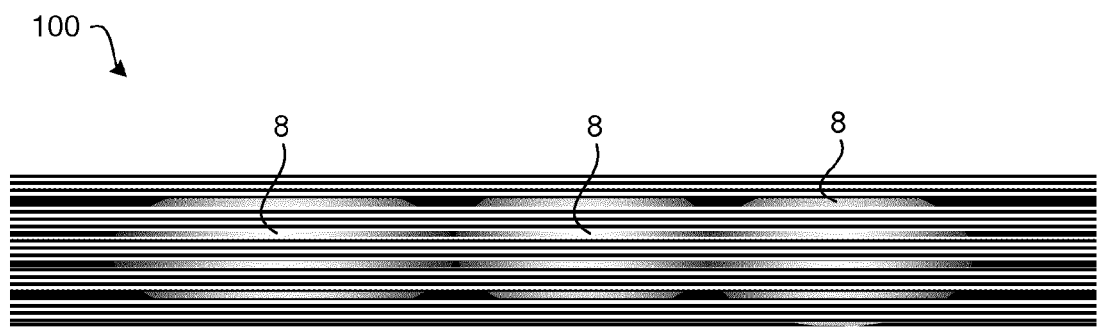
FIG. 2B shows a schematic illustration of the motor vehicle component from FIG. 2A in a further view.

FIG. 2B illustrates the motor vehicle component 100 from FIG. 2A in a further view, in which a plan view of the second fiber composite material 2 or of the transparent, electrically insulating layer 6 is shown. The light 8 emitted by the light sources 3 from the light exit regions 4 indirectly via the reflection layer 7 provides indirect lighting that is more diffuse in comparison with the exemplary embodiment in accordance with FIG. 1A.

Alternatively or additionally, the exemplary embodiments shown in the figures can have further features in accordance with the embodiments of the general description.

LIST OF REFERENCE SIGNS

1 First fiber composite material
2 Second fiber composite material
3 Light source
4 Light exit region
5 Contact
6 Insulating layer
7 Reflection layer
8 Emitted light
100 Motor vehicle component

What is claimed is:

1. A motor vehicle component with a lighting function, the motor vehicle component comprising:
   a laminate component comprising a first fiber composite material and a second fiber composite material, wherein the first fiber composite material is electrically insulating and an entirety of the second fiber composite material is electrically conductive; and
   a light source which is at least partly embedded in the first fiber composite material,
   wherein the light source is electrically conductively connected to the second fiber composite material, and
   wherein the second fiber composite material has a light exit region that is configured to allow light emitted by the light source to exit from the light exit region so that the light is perceptible from outside the motor vehicle component.

2. The motor vehicle component according to claim 1, wherein the first fiber composite material is at least partly light-transmissive.

3. The motor vehicle component according to claim 1, wherein the first fiber composite material comprises at least one of glass fibers or carbon fibers.

4. The motor vehicle component according to claim 1, wherein the second fiber composite material comprises carbon fibers.

5. The motor vehicle component according to claim 1, wherein the light exit region is formed by a matrix material of the second fiber composite material.

6. The motor vehicle component according to claim 1, wherein the second fiber composite material comprises at least one of translucent or transparent fibers which at least partly form the light exit region.

7. The motor vehicle component according to claim 1, further comprising at least one contact which electrically conductively connects the light source to the second fiber composite material.

8. The motor vehicle component according to claim 1, wherein the laminate component further comprises a further second fiber composite material that is electrically conductive, and the first fiber composite material is arranged between the second fiber composite material and the further second fiber composite material.

9. The motor vehicle component according to claim 8, wherein the light source is electrically conductively connected to the second fiber composite material and to the further second fiber composite material.

10. The motor vehicle component according to claim 8, wherein the light source is electrically conductively connected to the second fiber composite material by a contact and is electrically conductively connected to the further second fiber composite material by a further contact.

11. The motor vehicle component according to claim 8, further comprising a reflection layer that is arranged between the first fiber composite material and the further second fiber composite material, and that is configured to reflect light emitted by the light source to allow the reflected light to exit from the light exit region.

12. The motor vehicle component according to claim 1, further comprising a functional layer arranged directly on the second fiber composite material.

13. The motor vehicle component according to claim 12, wherein the functional layer is an electrically insulating layer.

14. The motor vehicle component according to claim 1, wherein the light source is an LED or an LED light strip.

15. A motor vehicle comprising the motor vehicle component according to claim 1.

* * * * *